(12) United States Patent
Glick et al.

(10) Patent No.: US 9,876,317 B2
(45) Date of Patent: Jan. 23, 2018

(54) REPLACEABLE ADAPTER FOR USE WITH VEHICULAR BATTERY CHARGING SYSTEM

(71) Applicant: Lear Corporation, Southfield, MI (US)

(72) Inventors: Michael Glick, Farmington Hills, MI (US); Slobodan Pavlovic, Novi, MI (US); Reinhard Pusch, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 111 days.

(21) Appl. No.: 14/210,539

(22) Filed: Mar. 14, 2014

(65) Prior Publication Data

US 2014/0273645 A1    Sep. 18, 2014

Related U.S. Application Data

(60) Provisional application No. 61/786,792, filed on Mar. 15, 2013.

(51) Int. Cl.
*H01R 13/639* (2006.01)
*H01R 31/06* (2006.01)
(Continued)

(52) U.S. Cl.
CPC ...... *H01R 13/6392* (2013.01); *B60L 11/1818* (2013.01); *H01R 11/01* (2013.01);
(Continued)

(58) Field of Classification Search
CPC .................. H01R 13/6392; H01R 11/01
See application file for complete search history.

(56) References Cited

U.S. PATENT DOCUMENTS 2,867,680 A * 1/1959 Stecher ............ H02G 15/10
174/92
4,005,922 A    2/1977 Burkhart et al.
(Continued)

FOREIGN PATENT DOCUMENTS

| JP | H0479175 A | 3/1992 |
| JP | H09289062 A | 11/1997 |
| WO | 2012034806 A1 | 3/2012 |

OTHER PUBLICATIONS

Chinese Office Action, Application No. CN 201410098113.X dated Jun. 2, 2017.

*Primary Examiner* — James Harvey
(74) *Attorney, Agent, or Firm* — MacMillan, Sobanski & Todd, LLC (57) ABSTRACT

An energy transfer system includes an adapter having a power terminal port with a plurality of power terminals and an intermediate adapter terminal port with a plurality of intermediate adapter terminals. Each of the plurality of intermediate adapter terminals is in direct electrical communication with one of the plurality of adapter terminals. The energy transfer system also includes an intermediate complementary port that is configured to mate with the intermediate adapter terminal port to establish electrical communication between the plurality of intermediate adapter terminals and a plurality of complementary intermediate terminals. The adapter terminal port is configured not to mate with the intermediate terminal port and not to mate with the intermediate complementary terminal port.

15 Claims, 7 Drawing Sheets

(51) Int. Cl.
*H01R 11/01* (2006.01)
*H01R 13/642* (2006.01)
*B60L 11/18* (2006.01)

(52) U.S. Cl.
CPC .......... *H01R 13/642* (2013.01); *H01R 31/06* (2013.01); *B60L 2230/12* (2013.01); *H01R 2201/26* (2013.01); *Y02T 10/7005* (2013.01); *Y02T 10/7088* (2013.01); *Y02T 90/121* (2013.01); *Y02T 90/14* (2013.01); *Y02T 90/16* (2013.01)

(56) References Cited

U.S. PATENT DOCUMENTS

| | | | |
|---|---|---|---|
| 4,569,567 A * | 2/1986 | Zucchini | H01R 27/00 439/578 |
| 4,592,613 A | 6/1986 | Tong | |
| 4,623,753 A * | 11/1986 | Feldman | H01R 4/2483 174/50 |
| 4,713,021 A * | 12/1987 | Kobler | H01R 13/5205 439/272 |
| 4,883,945 A * | 11/1989 | Bautista | H01R 13/595 219/541 |
| 4,946,396 A * | 8/1990 | Saitoh | H01R 31/06 439/500 |
| 5,002,506 A | 3/1991 | Tsay | |
| 5,066,242 A * | 11/1991 | Martucci | H01R 13/6271 439/281 |
| 5,066,905 A * | 11/1991 | Betton | G01R 19/145 200/317 |
| 5,154,639 A * | 10/1992 | Knoll | H01R 9/2441 361/119 |
| 5,195,907 A | 3/1993 | Urban | |
| 5,369,352 A | 11/1994 | Toepfer et al. | |
| 5,395,264 A * | 3/1995 | Keith | H01R 31/06 439/502 |
| 6,151,448 A * | 11/2000 | Reusche | A01K 7/027 219/536 |
| 6,644,987 B2 * | 11/2003 | Meleck | B60R 11/00 439/107 |
| 6,810,206 B1 * | 10/2004 | Clark, Jr. | F24H 9/1818 392/448 |
| 7,101,221 B1 * | 9/2006 | Chen | H01R 25/16 439/502 |
| 7,259,971 B1 * | 8/2007 | Allen | H02M 3/28 361/789 |
| 7,322,849 B2 * | 1/2008 | Sutton | B60R 16/0207 439/502 |
| 7,387,537 B1 * | 6/2008 | Daily | H01R 13/6272 439/281 |
| 7,980,872 B1 | 7/2011 | Smutny et al. | |
| 8,475,188 B2 * | 7/2013 | Gosling | H01R 25/164 439/151 |
| 2003/0211775 A1 * | 11/2003 | Marchand | H01R 13/443 439/502 |
| 2004/0132328 A1 | 7/2004 | Wu | |
| 2004/0248462 A1 * | 12/2004 | Dyer | H01R 29/00 439/502 |
| 2005/0176281 A1 | 8/2005 | Zhuge | |
| 2007/0161278 A1 | 7/2007 | Yen et al. | |
| 2008/0303625 A1 | 12/2008 | Ding | |
| 2010/0013438 A1 | 1/2010 | Anwar et al. | |
| 2010/0112851 A1 * | 5/2010 | Giefers | H01R 4/4809 439/535 |
| 2010/0311262 A1 * | 12/2010 | Cours | H01R 13/6641 439/281 |
| 2011/0117783 A1 | 5/2011 | Su | |
| 2011/0121780 A1 | 5/2011 | Fukuo et al. | |
| 2011/0172839 A1 | 7/2011 | Brown et al. | |
| 2011/0183537 A1 * | 7/2011 | Fornage | H01R 13/639 439/271 |
| 2012/0119702 A1 | 5/2012 | Gaul et al. | |
| 2012/0142208 A1 | 6/2012 | Peng et al. | |
| 2012/0156915 A1 | 6/2012 | Wu | |
| 2012/0206840 A1 | 8/2012 | Goelz et al. | |
| 2012/0264319 A1 * | 10/2012 | Chikano | H01R 13/6273 439/248 |
| 2013/0170604 A1 | 7/2013 | Falk | |
| 2013/0225005 A1 * | 8/2013 | Fornage | H01R 12/613 439/658 |
| 2014/0273645 A1 * | 9/2014 | Glick | H01R 31/06 439/628 |
| 2015/0280439 A1 * | 10/2015 | Zimmerman | H02J 3/383 307/82 |

* cited by examiner

REPLACEABLE ADAPTER FOR USE WITH VEHICULAR BATTERY CHARGING SYSTEM

CROSS-REFERENCE TO RELATED APPLICATIONS

This application claims the benefit of U.S. Provisional Application No. 61/786,792, filed Mar. 15, 2013, the disclosure of which is incorporated herein by reference.

BACKGROUND OF THE INVENTION

This invention relates in general to battery charging systems, such as are used to connect a battery of an electric vehicle to an exterior electric power source. In particular, this invention relates to an improved structure for such a battery charging system, wherein the structure includes an adapter for charging the electrical vehicle from a conventional 110-volt outlet.

Electric vehicles are typically provided with one or more rechargeable batteries. In some vehicles, the rechargeable batteries may be charged by plugging in to an external power source, such as a conventional electrical outlet. Such charging of the vehicle batteries may occur frequently, and plugging in a vehicle to charge once a day is not unusual. Each time the vehicle battery is charged, a charging cord of a battery charging system provided on the vehicle is connected to an electrical outlet assembly, then is subsequently removed therefrom in order to stop charging or to operate the vehicle. As a result, the physical acts of both plugging in the charging cord to the electrical outlet and subsequently removing same can occur frequently. Therefore, the charging cord of the conventional battery charging system is subjected to undesirable mechanical fatigue and potential failure. Failure in the charging cord can make it difficult or impossible to recharge the rechargeable batteries without first repairing the charging cord. It would be desirable to provide an improved structure for such a battery charging system that avoids this potential problem.

SUMMARY OF THE INVENTION

This invention relates to an energy transfer system. The energy transfer system includes an adapter having a power terminal. The power terminal includes a plurality of power terminals. The energy transfer system includes an intermediate adapter terminal. The intermediate adapter terminal includes a plurality of intermediate adapter terminals. Each of the plurality of intermediate adapter terminals is in direct electrical communication with one of the plurality of adapter terminals. The energy transfer system includes an intermediate complementary. The intermediate complementary is configured to mate with the intermediate adapter terminal to establish electrical communication between the plurality of intermediate adapter terminals and a plurality of complementary intermediate terminals. The adapter terminal is configured not to mate with the intermediate terminal. The adapter terminal is configured not to mate with the intermediate complementary terminal.

This invention also relates to an adapter for an energy transfer system. The adapter includes a power terminal. The power terminal includes a plurality of power terminals. The adapter includes an intermediate adapter terminal. The intermediate adapter terminal includes a plurality of intermediate adapter terminals. Each of the plurality of intermediate adapter terminals is in direct electrical communication with one of the plurality of power terminals. The power terminal is configured to mate with a complementary power terminal. The intermediate adapter terminal is configured not to mate with the complementary power terminal.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
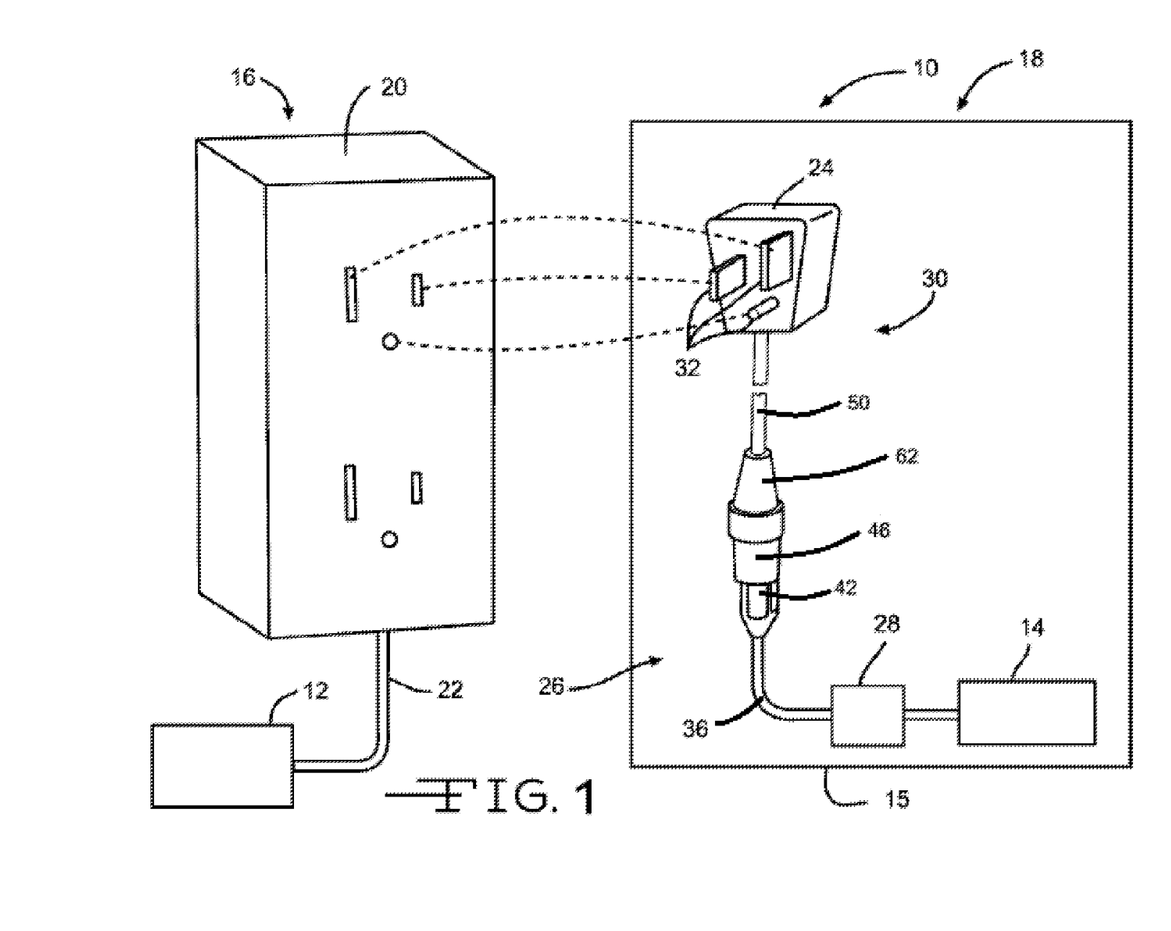
FIG. 1 is a perspective view of an energy transfer system having a replaceable adapter.

Referring now to the drawings, there is illustrated in FIG. 1 a schematic view of an energy transfer system, indicated generally at 10. The illustrated energy transfer system 10 is configured to provide electrical power from a power source 12 to a battery 14 on an electric vehicle, shown schematically at 15. However, it should be appreciated that this is only one embodiment, and the energy transfer system 10 may be used in other electrical energy transfer applications, if desired, and is not limited to recharging batteries, nor is it limited to transferring power to the electrical vehicle 15.

The illustrated energy transfer system 10 includes a stationary side, indicated generally at 16, and a vehicle side, indicated generally at 18. The stationary side 16 of the energy transfer system 10 includes the power source 12 and an outlet 20. Power is supplied from the power source 12 to the outlet 20 by a power line 22. The illustrated outlet 20 is a conventional three-prong outlet, and the power source 12 is a conventional municipal power source. However, it should be appreciated that the power source 12 may be any desired source of electrical power, such as a generator or batteries, and the outlet 20 may be any desired electrical connector, such as a two prong outlet, a 220-volt connector, or a customized electrical connection. The power line 22 is shown only schematically, but can include all wiring, breakers, and other components necessary to provide electrical power from the power source 12 to the outlet 20.

The components of the vehicle side 18 of the energy transfer system 10 are configured to transfer power from the outlet 20 to the battery 14. The vehicle side 18 of the energy transfer system 10 includes a plug 24 that is configured to engage the outlet 20. The illustrated plug 24 is a conventional three-prong, but it should be appreciated that the plug 24 can be any desired type of connector that is compatible with the outlet 20. The plug 24 is part of a charging cord assembly, indicated generally at 26, that is connected to the battery 14. The charging cord assembly 26 is shown only schematically, but can include all wiring, breakers, and other components necessary to provide electrical power from the plug 24 to the battery 14 and may include any components of a vehicle charging system, indicated schematically at 28, that are adapted to receive and process the electrical current from the plug 24 for charging the battery 14.

The charging cord assembly 26 includes a replaceable adapter, indicated generally at 30. The replaceable adapter 30 is provided on the charging cord assembly 26 in order to allow the portions of the charging cord assembly 26 that are expected to experience the most wear to be replaced relatively easily. In normal use of the charging cord assembly 26, the plug 24 is inserted into the outlet 20 in order to transfer power from the power source 12 to the battery 14 to charge the battery 14. The plug 24 includes a plurality of terminals 32, which are electrically-conductive blades and which engage a plurality of complementary terminals in the outlet 20, which are female terminals (not shown). The female terminals are biased against the terminals 32 in order to maintain electrical contact between the female terminals and the terminals 32. When it is no longer desired to charge the battery 14, the plug 24 is unplugged from the outlet 20, disengaging the female terminals and the terminals 32. It should be appreciated that repeatedly plugging and unplugging the plug 24 into the outlet 20 can result in wear to both the plug 24 and the outlet 20, and as a result it may be necessary to replace the plug 24 during the useful life of the charging cord assembly 26. The replaceable adapter 30 allows the plug 24 to be replaced without having to replace the entire charging cord assembly 26. It should be appreciated that the replaceable adapter 30 allows the plug 24 to be replaced if it is damaged by any cause.

Figure 2:
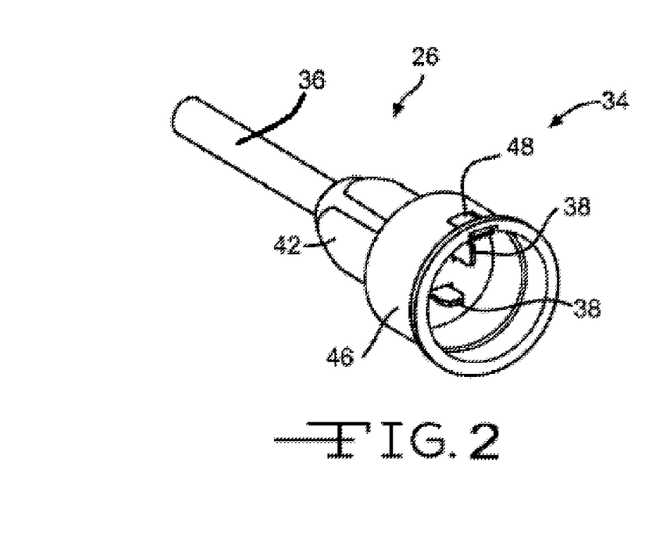
FIG. 2 is a perspective view, from the front, of an end portion of a charging cable for the battery charging system shown illustrated in FIG. 1.
Figure 3:
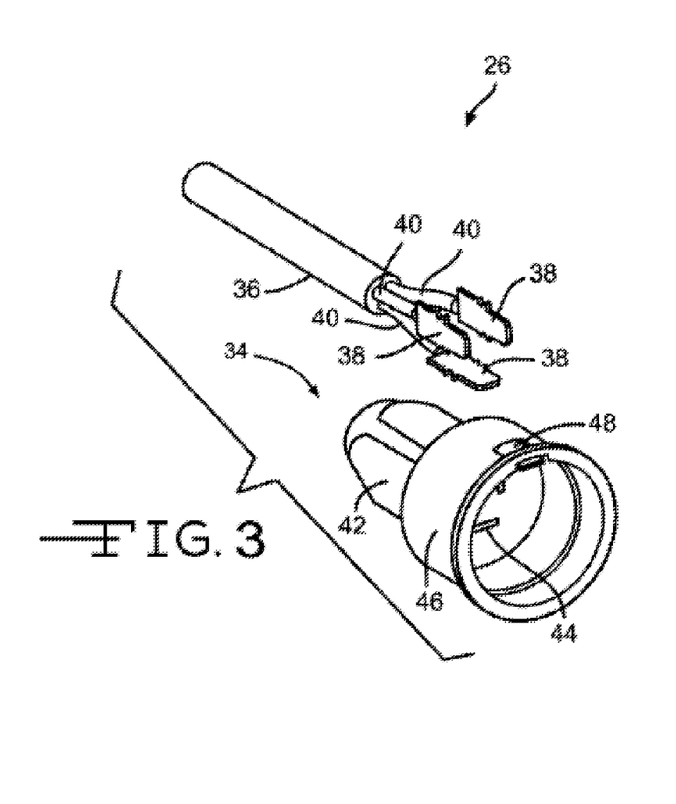
FIG. 3 is an exploded perspective view of the end portion of the charging cable illustrated in FIG. 2.

Referring now to FIGS. 2 and 3, there are shown perspective views, from the front, of an adapter plug, indicated generally at 34. The adapter plug 34 is located on the charging cord assembly 26. As shown, the charging cord assembly 26 includes an adapter end 36 where adapter blades 38 are connected to charge wires 40. The illustrated charging cord assembly 26 includes three charge wires 40 and three adapter blades 38, one hot lead, one neutral lead, and one ground lead. It should be appreciated that the charging cord assembly 26 may include a different number or configuration of charge wires 40 from that illustrated, if desired. Additionally, it should be appreciated that the adapter blades 38 may be replaced with other desired electrical terminals, such as female terminals or barrel terminals. The adapter blades 38 are in electrical communication with the vehicle charging system 28 through the charge wires 40 and allow electric current to be supplied to the vehicle charging system 28 to charge the battery 14. The adapter plug 34 includes a receptacle housing 42. The receptacle housing 42 is a plastic piece that serves, in part, to hold the adapter blades 38. As shown in FIG. 3, the receptacle housing 42 includes a plurality of slots 44 that the adapter blades 38 are press fit into in order to assemble the adapter plug 34, as shown in FIG. 2. The adapter plug 34 includes an optional shroud 46 that at least partially surrounds the assembled adapter blades 38. The shroud 46 serves in part to protect the adapter blades 38 from damage. The adapter plug 34 also includes an optional latch 48, the operation of which will be described below. It should be appreciated that the illustrated adapter plug 34 is only one, non-limiting embodiment, and the adapter plug 34 may be made of different materials and may have a different structure from that illustrated, if desired.

Figures 4, 6:
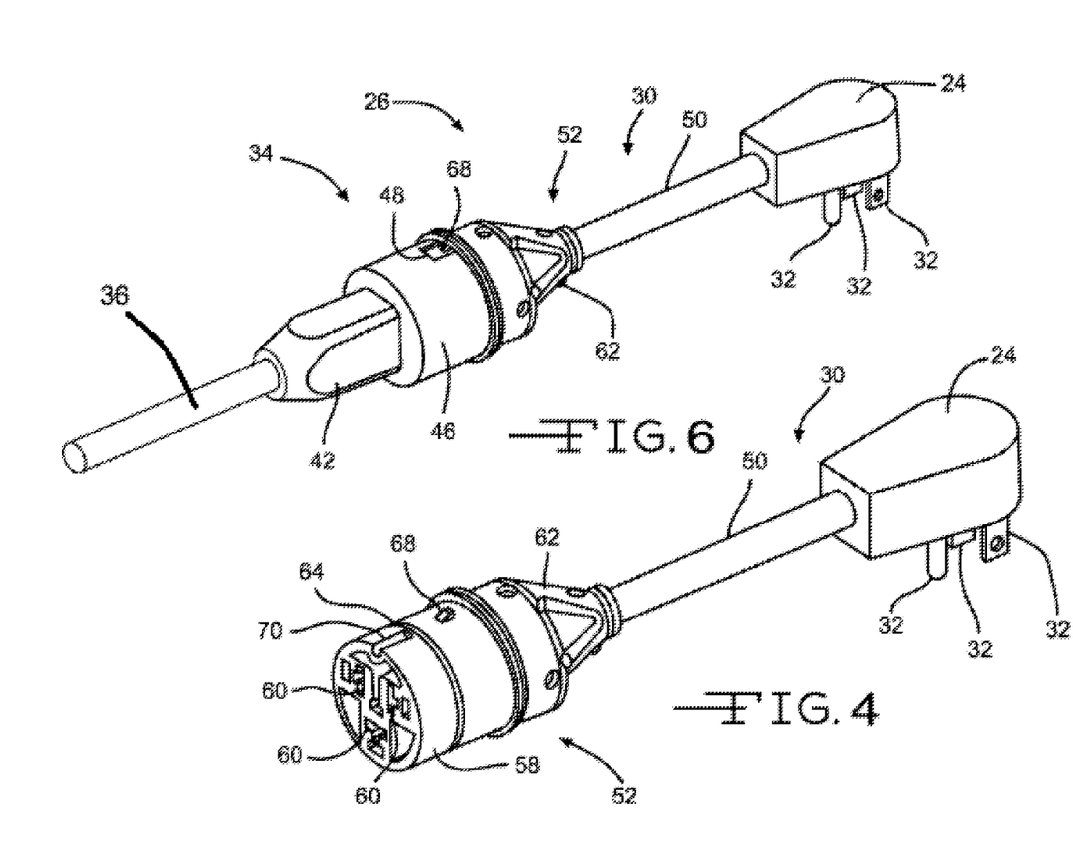
FIG. 4 is a perspective view, from behind, of the replaceable adapter shown in FIG. 1.
FIG. 6 is a perspective view, from behind, of the end portion of the charging cable attached to the replaceable adapter.
Figure 5:
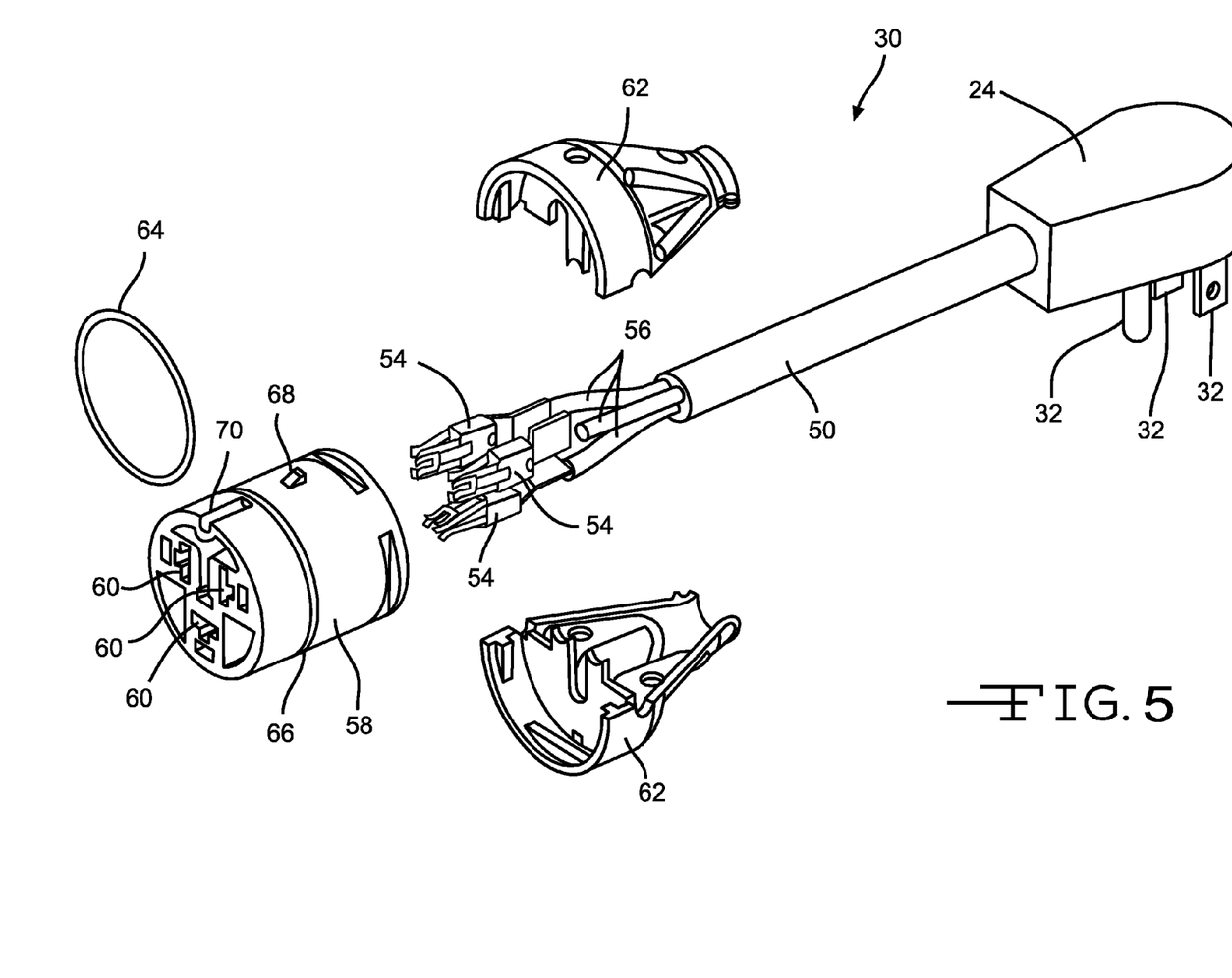
FIG. 5 is an exploded perspective view of the end portion of the replaceable adapter of FIG. 4.

Referring now to FIGS. 4 and 5, there are shown perspective views, from behind, of the replaceable adapter 30. The replaceable adapter 30 includes an adapter cord 50 that connects the plug 24 to an adapter outlet, indicated generally at 52. The adapter cord 50 may be of any desired length. Further, the adapter outlet 52 may be connected directly to the plug 24, if desired, omitting the adapter cord 50 entirely. As shown in FIG. 5, the adapter outlet 52 includes three adapter outlet terminals 54 that are connected to adapter wires 56 located in the adapter cord 50. The illustrated adapter cord 50 includes three adapter wires 56, one hot lead, one neutral lead, and one ground lead. It should be appreciated that the adapter cord 50 may include a different number or configuration of adapter wires 56 from that illustrated, if desired. Additionally, it should be appreciated that the adapter outlet terminals 54 may be replaced with other desired electrical terminals, such as male blade terminals or pin terminals. The adapter wires 56 are also attached to the terminals 32 on the plug 24, in order to provide electrical communication between the plug 24 and the adapter outlet 52. Each of the adapter outlet terminals 54 is in direct electrical communication with one of the terminals 32. That is, a voltage difference between the hot lead and the neutral lead at the plug 24 will be the same as the voltage difference between the hot lead and the neutral lead at the adapter outlet 52, excepting for losses in the adapter cord 50.

The adapter outlet 52 includes an adapter outlet housing 58. The adapter outlet housing 58 is a plastic piece that serves, in part, to hold the adapter outlet terminals 54. As shown in FIG. 5, the adapter outlet housing 58 includes plurality of adapter slots 60 that extend therethrough. The adapter outlet terminals 54 are supported within the adapter slots 60. The adapter outlet 52 also includes a cord support 62. The cord support 62 is snap fit onto the adapter outlet housing 58 (as shown in FIG. 4) in order to help maintain the adapter cord 50 in the proper position relative to the adapter outlet housing 58 and to help maintain the adapter outlet terminals 54 in the proper position within the adapter slots 60.

As shown in FIG. 6, the adapter plug 34 and the adapter outlet 52 may be mated. This electrically connects the replaceable adapter 30 to the vehicle charging system 28. The shroud 46 on the receptacle housing 42 partially surrounds the adapter outlet housing 58, and the adapter blades 38 are inserted into the adapter slots 60 to engage the respective adapter outlet terminals 54. It should be appreciated that the adapter outlet terminals 54 on the adapter outlet 52 are compatible with the adapter blades 38 on the adapter plug 34. As seen in FIG. 4 and FIG. 5, the adapter outlet 52 includes an optional O-ring 64 that is placed in a circumferential groove 66 on the adapter outlet housing 58. When the adapter plug 34 and the adapter outlet 52 are mated, the O-ring 64 is located between the adapter outlet housing 58 and the shroud 46 and provides a seal to help prevent debris from coming into contact with the adapter blades 38 and the adapter plug terminals 54. Additionally, the adapter outlet 52 includes an optional post 68. The post 68 is engaged by the latch 48 on the adapter plug 34 in order to maintain the position of the adapter plug 34 relative to the adapter outlet 52. The adapter plug 34 includes an optional guide 70, which is a groove in the adapter outlet housing 58. The adapter outlet 52 includes a corresponding projection (not shown) on the shroud 46. The guide 70 serves to limit the positions in which an operator may attempt to mate the adapter plug 34 and the adapter outlet 52 in order to assist in proper alignment of the adapter plug 34 and to help prevent damage to the adapter blades 38.

The adapter plug 34 and the adapter outlet 52 provide the charging cord assembly 34 with an intermediate outlet and plug between the battery 14 and the plug 24. That is, the vehicle charging system 28 includes the plug 24 that is configured to be connected to a power source 14 by mating with the outlet 20, and it also includes the adapter plug 34 that is located between the plug 24 and the battery 14. Additionally, in the illustrated embodiment, the adapter plug 34 is not able to be mated with the outlet 20. As can be seen in reference to FIGS. 1 and 2, the shroud 46 extends forward of the adapter blades 38, which will help prevent the adapter blades 38 from being inserted into the outlet 20. Additionally, the configuration of the adapter blades 38 is different from configuration of the terminals 32, and the adapter blades 38 are not compatible with the outlet 20, which also helps prevent the adapter blades 38 from being inserted into the outlet 20. This incompatibility between the adapter plug 34 and the outlet 20 is an optional feature that is advantageous in that it prevents the operator from mating the adapter plug 34 directly with the outlet 20 either intentionally or accidentally. It should be appreciated that while the illustrated embodiment has the adapter outlet 52 as part of the replaceable adapter 30 and wired directly to the plug 24, this is not necessary. If desired, the adapter plug 34 may be part of the replaceable adapter 30.

In use, the replaceable adapter 30 is connected to the charging cord assembly 26 and the operator mates the plug 24 with the outlet 20 to charge the battery 14, and removes the plug 24 from the outlet 20 to operate the electric vehicle 15. When it becomes necessary to replace the plug 24 due to wear or damage, the operator disengages the adapter plug 34 from the adapter outlet 52 and replaces the replaceable adapter 30 with a new replaceable adapter (not shown). The original replaceable adapter 30 may be dealt with by being disposed of or being sent to the manufacturer for repair, for example.

The illustrated embodiment shows the replaceable adapter 30 as part of the vehicle charging system 28. However, it should be appreciated that the replaceable adapter may be included alternatively or additionally as part of the stationary side 16 of the energy transfer system 10, if desired.

It should be appreciated that the previously-described embodiment is only one, non-limiting example. In other embodiments, the plug 24 may be any desired power terminal, such as a conventional two-prong plug, a 220-volt plug, an SAE J1772 connector, or a conventional three-plug outlet, for example. Further, the outlet 20 may be any complementary terminal that is configured to mate with the adapter terminal. Further, the adapter outlet 52 may be any desired intermediate adapter terminal, and the adapter plug 34 may be any intermediate complementary terminal that is configured to mate with the intermediate terminal. So, for example, the replaceable adapter may have two male ends, or two female ends. Further, the optional feature of preventing the operator from not using the replaceable adapter 30 may be provided by configuring the intermediate complementary terminal so that it cannot mate with the first complementary terminal.

Figure 7:
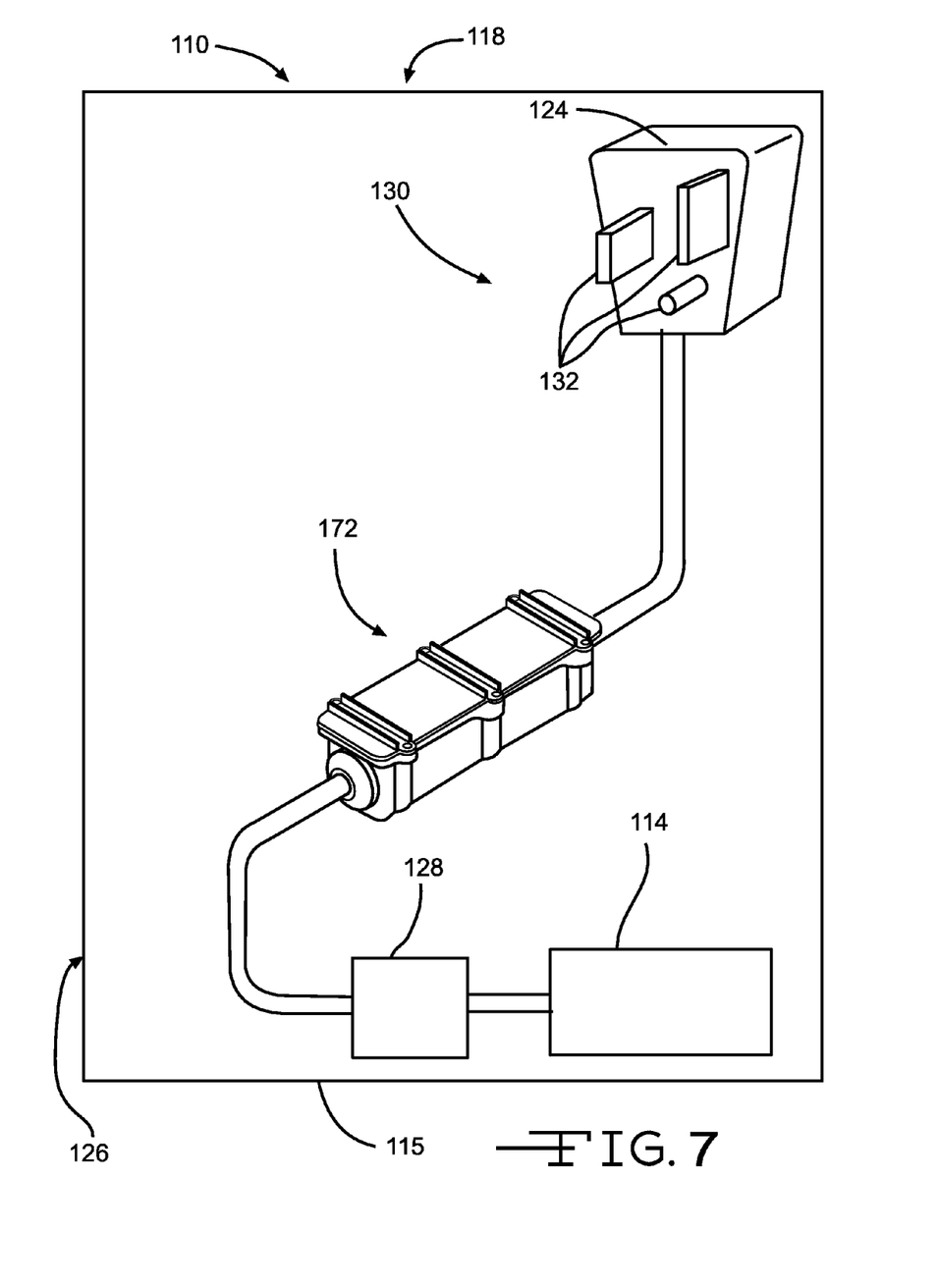
FIG. 7 is a schematic view of an alternative energy transfer system having an alternative replaceable adapter that includes a splice box.
Figure 8:
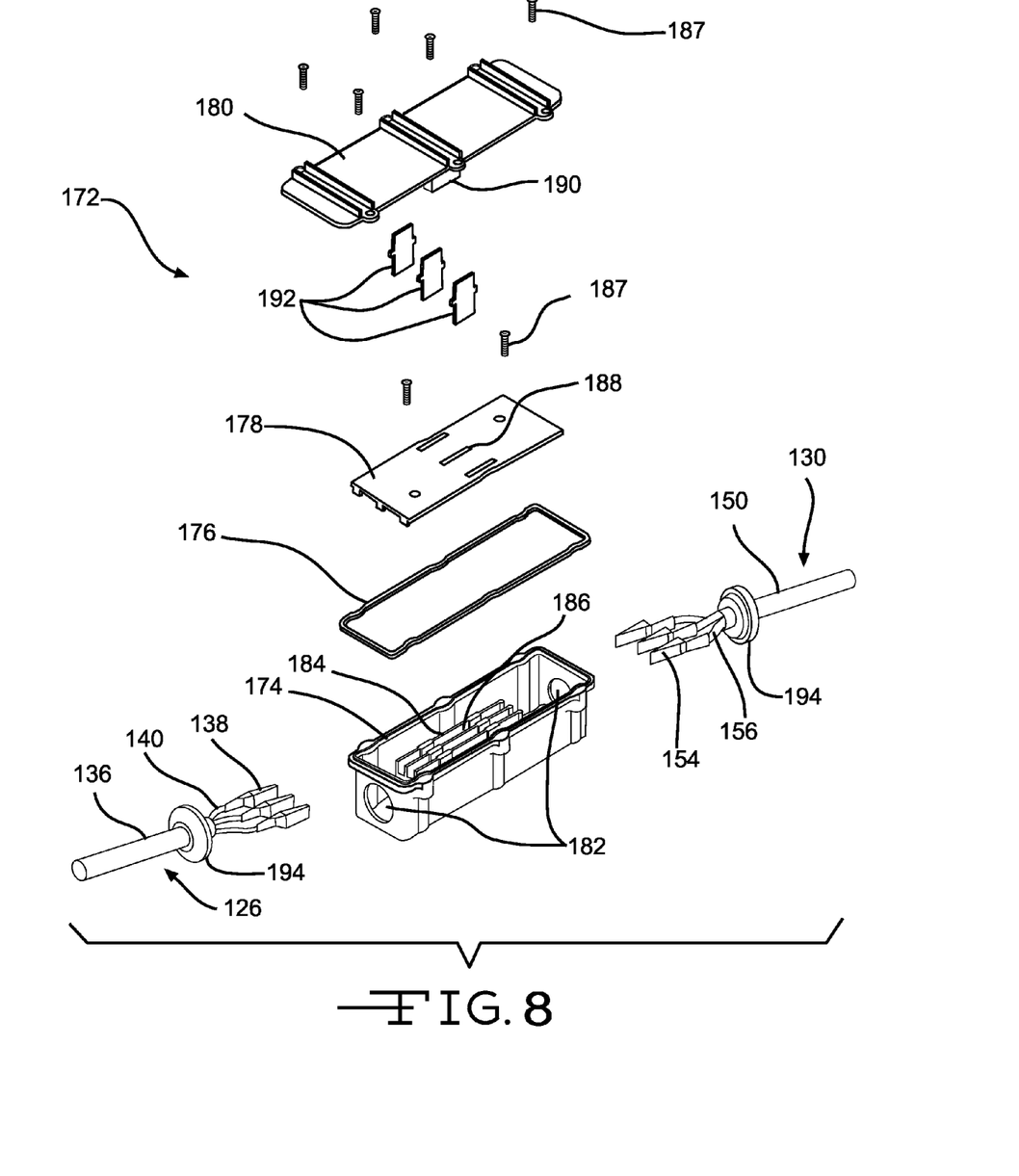
FIG. 8 is an exploded view of the splice box of FIG. 7.
Figure 9:
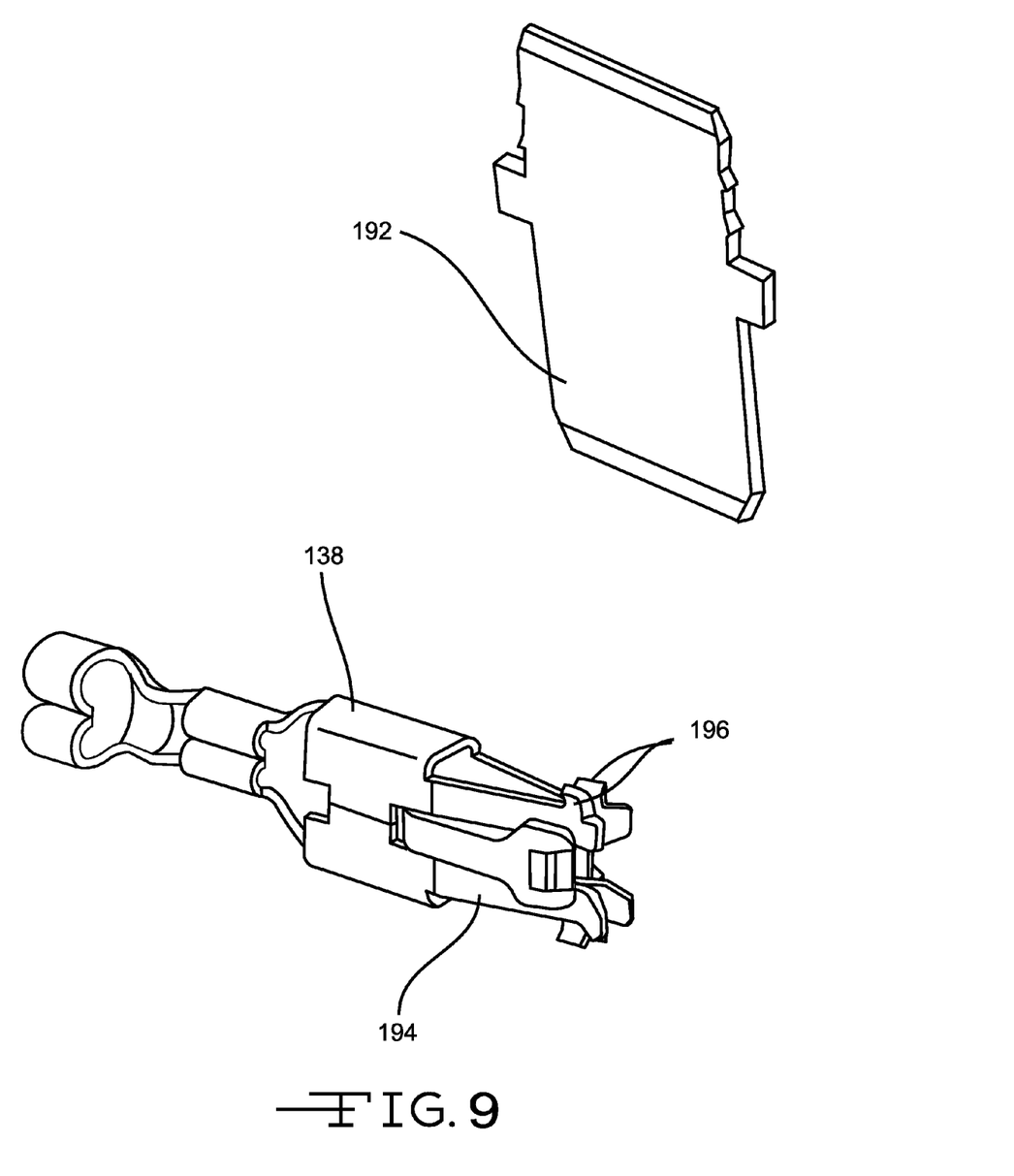
FIG. 9 is a close-up view of an electric terminal from the splice box of FIG. 8.

Referring now to FIGS. 7 through 9, there are shown an alternative energy transfer system, indicated generally at 110. The alternative energy transfer system 110 includes many features in common with the previously described energy transfer system 10. Those features that are common are identified by the same element number, incremented by 100, and will not be described in detail. The alternative energy transfer system 110 includes a splice box, indicated generally at 172, that may be used to connect a replaceable adapter 130 to a charging cord 126. Additionally, it should be appreciated that the splice box 172 may also be used in any other application.

Referring to FIG. 8, an exploded view of the splice box 172 is shown. The illustrated splice box 172 includes a splice housing 174, a face seal 176, a terminal cover 178, a plurality of splice blades 180, and a splice cover 182. The splice box 172 may have different components from those illustrated, if desired. The splice housing 174 may be molded from a polycarbonate, or may be made of any other desired material. The illustrated splice housing 174 includes openings 182 to allow the charging cord 126 and an adapter cord 150 to be inserted into the splice housing 174.

The charging cord 126 includes a splice end 136 where charge terminals 138 are connected to charge wires 140. The illustrated charging cord 126 includes three charge wires 140 and three charge terminals 138, one hot lead, one neutral lead, and one ground lead. It should be appreciated that the charging cord 126 may include a different number or configuration of charge wires 140 from that illustrated, if desired. Additionally, it should be appreciated that the charge terminals 138 may be replaced with other desired electrical connectors. The adapter cord 150 includes three adapter terminals 154 that are connected to adapter wires 156 located in the adapter cord 150. The illustrated adapter cord 150 includes three adapter wires 156 and three adapter terminals 154, one hot lead, one neutral lead, and one ground lead. It should be appreciated that the adapter cord 150 may include a different number or configuration of adapter wires 156 from that illustrated, if desired. Additionally, it should be appreciated that the adapter terminals 154 may be replaced with other desired electrical connectors.

The splice housing 174 may include terminal mounts 184. The illustrated terminal mounts 184 are channels molded into the body of the splice housing 174. However, the terminal mounts 184 may be made using other desired methods. The illustrated splice housing 174 includes three terminal mounts 184, but may include any desired number of terminal mounts. Each terminal mount 184 may be configured to retain one charge terminal 138 and one adapter terminal 154. One of the terminal mounts 184 retains the charge terminal 138 hot lead and the adapter terminal 154 hot lead as a corresponding pair of terminals. The second terminal mount 184 retains the charge terminal 138 neutral lead and the adapter terminal 154 neutral lead as a corresponding pair of terminals. The third terminal mount 184 retains the charge terminal 138 ground lead and the adapter terminal 154 ground lead as a corresponding pair of terminals. Each of the corresponding terminals 138 and 154 may be retained by the terminal mount 184 so that there is a terminal gap 186 between them and they are not in electrical communication with each other.

The terminal cover 178 may be molded from a polycarbonate, or may be made of any other desired material. The terminal cover 178 may be attached to the splice housing 174 by screws 187 or by any desired fastener or method. The terminal cover 178 may cover the charge terminals 138 and the adapter terminals 154. The terminal cover 178 may define a plurality of cover openings 188 that pass therethrough. The illustrated terminal cover 178 defines three cover openings 188, and when the terminal cover 178 is attached to the splice housing 174 each cover opening 188 is adjacent a terminal gap 186. The terminal cover 178 may include any desired number of cover openings 188. The purpose of the cover openings 188 will be described below.

The splice cover 182 may be molded from a polycarbonate or may be made of any other desired material. The splice cover 182 may be attached to the splice housing 174 by screws 187 or by any desired fastener or method. The splice cover 182 may include a plurality of blade mounts 190. The illustrated blade mounts 190 are molded as part of the splice cover 182, but the blade mounts 190 may be made by any desired method. The illustrated splice cover 182 includes three blade mounts 190, and each blade mount 190 retains a splice blade 180. When the splice cover 182 is attached to the splice housing 174, each splice blade 180 extends through one of the covering openings 188 in the terminal cover and into the terminal gap 186 adjacent to the respective covering opening 188. Each of the splice blades 180 may engage one charge terminal 138 and one adapter terminal 154 of a corresponding pair of terminals. The splice blades 180 then provide electric communication between the charge terminal 138 hot lead and the adapter terminal 154 hot lead, between the charge terminal 138 neutral lead and the adapter terminal 154 neutral lead, and between the charge terminal 138 ground lead and the adapter terminal 154 ground lead.

The face seal 176 may be made of synthetic rubber or any other desired material. The face seal 176 may be located between the splice housing 174 and the splice cover 182 in order to seal the splice box 172 to protect the terminals 138 and 154 from water and other environmental factors. Cord seals 194 may be provided on the charging cord 126 and the adapter cord 150 to seal the respective openings 182 in order to seal the splice box 172 to protect the terminals 138 and 154 from water and other environmental factors.

Referring to FIG. 9, a detail view of one of the charge terminals 138 is shown. Each of the charge terminals 138 and the adapter terminals 154 may have the same design, or may have different designs if desired. The charge terminal 138 is a female terminal that includes extended contact arms 196. The charge terminal 138 may be any other desired type of terminal. When the splice box 172 is assembled, the splice blade 180 is inserted between and is engaged by the contact arms 196. As previously described, each splice blade 180 will be inserted between the contact arms 196 of one charge terminal 138 and one adapter terminal 154 in order to establish electrical communication between the terminals 138 and 154.

In the illustrated embodiment, the charge terminal 138 is oriented so that the splice blade 180 engages the charge terminal 138 from the side. However, the charge terminal 138 may be oriented so that the splice blade 180 engages it from any desired orientation. The charge terminal 138 may include guides 198 that extend from the contact arms 196. The guides 198 define a funnel that helps to position the splice blade 180 between the contact arms 196 when the splice box 172 is assembled. It should be appreciated that when the splice cover 182 is removed from the splice box 172, the splice blades 180 will be removed from the respective terminal gaps 186, which may end electrical communication between the charge terminals 138 and the adapter terminals 154.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An energy transfer system that is configured to provide electrical power from a power source to a battery on an electric vehicle, the energy transfer system comprising:
   a stationary side that includes a power source that is connected to a power outlet; and
   a vehicle side that includes a battery on an electric vehicle, a charging cord assembly that is connected to the battery on the electric vehicle, and a replaceable adapter including a first end that is connected to the charging cord assembly of the vehicle side and a second end that is connected to the power outlet of the stationary side, wherein:
   the first end of the replaceable adapter is connected to the charging cord assembly by a splice box that supports at least three electrical connections between the replaceable adapter and the charging cord assembly, wherein the splice box further includes either:
   (a) at least three terminal mounts configured to provide terminal gaps between the at least three electrical connections; or
   (b) a splice housing comprising a plurality of terminal mounts configured to provide terminal gaps between the at least three electrical connections, a splice cover removably secured to the splice housing, a plurality of splice blades connected to the splice cover, and wherein removal of the splice cover from the splice housing ends electrical communication between the replaceable adapter and the charging cord assembly; or
   (c) a plurality of splice blades and a splice cover wherein the splice blades are connected to the plurality of splice cover via at least one blade mount; and
   the second end of the replaceable adapter has a plug provided thereon that is connected to the power outlet.

2. The energy transfer system defined in claim 1 wherein the adapter outlet is connected to the plug by an adapter cord, and wherein the adapter cord comprises at least three adapter terminals.

3. The energy transfer system defined in claim 1 wherein the splice box further comprises at least three terminal mounts configured to provide terminal gaps between the at least three electrical connections.

4. The energy transfer system defined in claim 3 wherein the splice box includes a splice housing containing a splice blade that connects the replaceable adapter to the charging cord assembly.

5. The energy transfer system defined in claim 4 wherein the replaceable adapter includes an adapter terminal that is connected to the splice blade, and wherein the charging cord assembly includes a charge terminal that is connected to the splice blade.

6. The energy transfer system defined in claim 3 wherein the splice box includes a splice housing containing a plurality of splice blades that connects the replaceable adapter to the charging cord assembly.

7. The energy transfer system defined in claim 6 wherein the replaceable adapter includes a plurality of adapter terminals respectively connected to the plurality of splice blades, and wherein the charging cord assembly includes a plurality of charge terminals respectively connected to the plurality of splice blades.

8. The energy transfer system defined in claim 7 wherein the splice box further comprises a terminal cover with a plurality of cover openings and wherein the splice blades extend through the cover openings.

9. The energy transfer system defined in claim 7 wherein the splice box further comprises:
   a splice cover; and
   a terminal cover located between the splice cover and the plurality of adapter terminals.

10. The energy transfer system of 1 wherein the splice box further comprises:
   a splice housing comprising a plurality of terminal mounts configured to provide terminal gaps between the at least three electrical connections;
   a splice cover removably secured to the splice housing;
   a plurality of splice blades connected to the splice cover; and
   wherein removal of the splice cover from the splice housing ends electrical communication between the replaceable adapter and the charging cord assembly.

11. The energy transfer system defined in claim 1 wherein the splice box further comprises a plurality of splice blades and a splice cover.

12. The energy transfer system defined in claim 11 wherein the splice blades are connected to the splice cover via at least one blade mount.

13. An energy transfer system comprising:
   a charging cord assembly that includes a plurality of charge terminals;
   a replaceable adapter that includes a plurality of adapter terminals;
   wherein the replaceable adapter is configured to be electrically connected to the charging cord assembly by a splice box;
   wherein the splice box further comprises:
   a splice housing comprising a plurality of terminal mounts configured to provide terminal gaps between the charge terminals and the adapter terminals;
   a splice cover removably secured to the splice housing;
   a plurality of splice blades connected to the splice cover; and
   wherein removal of the splice cover from the splice housing precludes electrical connections between the replaceable adapter and the charging cord assembly.

14. The energy transfer system defined in claim 13 wherein the splice box further comprises a terminal cover that defines a plurality of cover openings configured to receive the plurality of splice blades, and wherein each cover opening is adjacent a terminal gap;
   wherein the plurality of charge terminals and the plurality of adapter terminals are retained by the plurality of terminal mounts;
   wherein each of the plurality of splice blades is configured to engage one charge terminal and one adapter terminal; and
   wherein the replaceable adapter and the charging cord assembly are configured to be mechanically connected together and electrically disconnected from one another when the splice cover is removed.

15. The energy transfer system defined in claim 13 wherein the plurality of adapter terminals have guides configured to position the adapter terminals relative to the splice blades.

* * * * *